United States Patent
Seymour

[11] Patent Number: 5,562,007
[45] Date of Patent: Oct. 8, 1996

[54] WHEEL MOUNTING FIXTURE FOR DOUBLE BEAD SEAT MACHINING

[75] Inventor: James B. Seymour, Columbia City, Ind.

[73] Assignee: Hayes Wheels International, Inc., Romulus, Mich.

[21] Appl. No.: 357,685

[22] Filed: Dec. 16, 1994

[51] Int. Cl.$^6$ ............................ B23B 1/00; B23B 5/34; B23B 31/42

[52] U.S. Cl. ................ 82/1.11; 279/2.24; 279/106; 279/141; 279/156

[58] Field of Search .................. 279/2.24, 106–109, 279/133, 141, 156; 29/802; 82/168, 169, 1.11; 269/48.1

[56] References Cited

U.S. PATENT DOCUMENTS

| | | | |
|---|---|---|---|
| 1,959,081 | 5/1934 | Le Jeune | 279/141 |
| 2,194,936 | 3/1940 | Hatch | 279/2.24 |
| 2,557,726 | 6/1951 | Caswell | 279/2.24 |
| 3,131,946 | 5/1964 | Newhouser | 279/133 |
| 3,323,808 | 6/1967 | Newhouser | 279/141 |
| 5,464,233 | 11/1995 | Hanai | 279/106 |

FOREIGN PATENT DOCUMENTS

| | | | |
|---|---|---|---|
| 353131588 | 11/1978 | Japan | 279/141 |
| 35713551 | 8/1982 | Japan | 279/141 |

*Primary Examiner*—Steven C. Bishop
*Attorney, Agent, or Firm*—MacMillan, Sobanski & Todd

[57] ABSTRACT

A fixture for mounting a vehicle wheel upon a lathe. The fixture includes a support structure which carries a plurality of movable arms. The arms extend axially within the wheel rim and through the wheel pilot hole. The arms have jaws formed on their ends. The arms are movable to cause the jaws to clamp the wheel hub against the support structure. Because the arms clamp the wheel hub, the entire outside surface of the wheel rim is exposed for machining, allowing machining of both tire bead seats during the same machining operation.

13 Claims, 3 Drawing Sheets

5,562,007

WHEEL MOUNTING FIXTURE FOR DOUBLE BEAD SEAT MACHINING

BACKGROUND OF THE INVENTION

This invention relates in general to fixtures for mounting vehicle wheels on machine tools during finishing operations and in particular to a fixture for mounting a vehicle wheel on a lathe while the exterior surface of the wheel rim is turned to its final shape.

Light weight alloy vehicle wheels are becoming increasingly popular. Such wheels typically include an annular wheel rim which carries a tire. The wheel rim has a recessed center portion which facilitates mounting the tire upon the rim. The ends of the wheel rim include inboard and outboard tire bead seats which support the tire. Inboard and outboard tire bead retaining flanges are formed on the ends of the wheel rim to retain the tire upon the wheel rim.

A circular wheel disc is formed across one end of the wheel rim. The wheel disc usually includes a central hub portion supported within the wheel rim by a plurality of wheel spokes. A central pilot hole and plurality of wheel mounting holes are formed through the wheel hub. The mounting holes are drilled equally spaced about a circle which is concentric with the pilot hole. The central pilot hole is used to position the wheel on a vehicle and the mounting holes are used to secure the wheel to the vehicle.

One conventional process for manufacturing light weight alloy wheels involves pouring molten metal into a wheel mold to form a casting of the wheel. After the molten metal solidifies, the wheel casting is removed from the mold. The wheel casting is oversized and is machined to final shape with machining operations.

Finishing the wheel casting typically includes multiple machining operations. Sawing machines cut any casting gates and risers from the wheel casting. A drilling machine is used to drill the central pilot hole and the wheel mounting holes through the wheel hub. The wheel casting is mounted upon a lathe for machining to its final shape. During the lathe operations, the inside surface of the wheel hub is usually faced to provide a flat mounting surface. Similarly, the outboard wheel hub surface is faced and both the inside and outside of the wheel rim are turned to their final shapes. During the finishing of the outside of the wheel rim, the tire bead seats are turned to their final diameter. Additionally, portions of the wheel can be painted or covered with a clear coating to protect the wheel from corrosion and/or enhance its appearance.

The machining operations are carried out with highly automated machining stations, which usually include numerically controlled machine tools designed to complete one or more specific machining operations. The wheels are sequentially moved between the machining stations, with the machine tool located at each station completing a portion of the required machining. For example, a typical wheel production facility can include multiple lathe stations. The lathe stations can include one lathe for facing the inboard wheel hub surface, a second lathe for facing the outboard wheel disc surface, a third lathe to turn the inside surface of the wheel rim and a fourth lathe to turn the outside surface of the wheel rim. Alternately, a special lathe can be designed to perform more than one of the above operations at a single machining station. Mounting fixtures are typically designed for each machine tool to facilitate mounting and demounting the wheels on the tool.

SUMMARY OF THE INVENTION

This invention relates to an improved fixture for mounting a vehicle wheel on a lathe which permits machining both tire bead seats a single machining operation.

The improved wheel mounting fixture includes a support structure adapted to be secured to a lathe spindle. A plurality of arms are movably mounted upon the support structure. The arms are adapted to extend axially within a vehicle wheel and are movable between first and second positions. The arms also are adapted to clamp a portion of the vehicle wheel disc against a portion of the support structure when they are in the second position. The fixture also includes means for moving the arms from the first position to the second position.

The support structure can include an adapter plate which can be secured to an end of a lathe spindle. A face plate is mounted upon the adapter plate. A part rest which rest is adapted to support a vehicle wheel and has a center aperture formed therethrough is mounted upon the face plate. The arms are movably mounted upon the face plate. Each of the arms has an end formed as a clamp jaw When the arms are in the second position, the clamp jaws cooperate with the part rest to clamp a portion of the wheel disc therebetween.

The means for moving the cam arms from the first position to second position can include an axially shiftable yoke plate which is disposed within the adapter plate. The arms are pivotably attached to the yoke plate. The arms have a cam slot formed therethrough. A stationary cam pin, which is mounted upon the face plate extends through the cam slot. When the yoke plate is axially shifted, the cam slot is drawn over the cam pin. The cam slots and cam pins cooperate to urge the arms from the first position to the second position.

The mounting fixture can further include an annular dampening ring which is disposed around the adapter plate. The dampening ring is resiliently coupled to the face plate and supports the wheel rim flange which is opposite form the wheel disc.

The improved wheel mounting fixture permits turning the outside surface of the wheel rim in a single machining operation.

Other advantages of the invention will become apparent to those skilled in the art from the following detailed description of the preferred embodiment, when read in light of the accompanying drawings,

DETAILED DESCRIPTION OF THE PREFERRED EMBODIMENT

Figure 1:
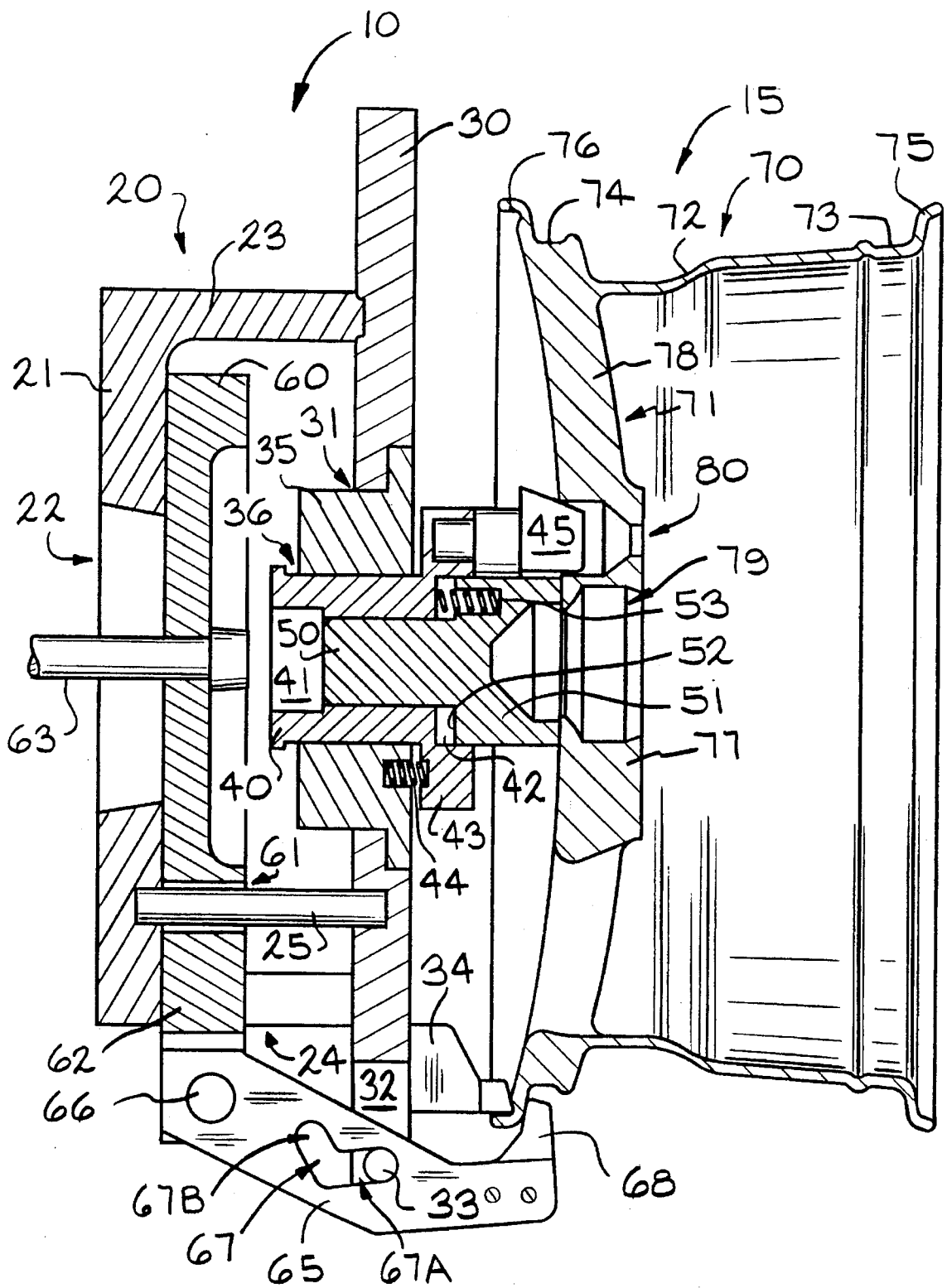
FIG. 1 is a sectional view of a mounting fixture for mounting a wheel upon a lathe and a vehicle wheel in accordance with the prior art.

Referring now to the drawings, there is shown in FIG. 1 a sectional view of a fixture for mounting a vehicle wheel upon a lathe, generally indicated at 10, in accordance with the prior art. In the interest of simplicity, fasteners which secure components of the mounting fixture 10 to one another are not shown in FIG. 1. A typical vehicle wheel 15, which will be described below, is shown mounted on the fixture 10.

The mounting fixture 10 includes an adapter plate 20 which can be secured to the rotatable spindle of a lathe (not shown) by conventional means. The adapter plate 20 includes a circular base 21 which has a central circular opening 22 formed therethrough. The adapter plate 20 also includes a cylindrical sleeve 23 extending axially from the base 21. The sleeve 23 has a plurality of axial slots 24 (one shown) formed therethrough. The slots are spaced equally about the circumference of the sleeve 24. The purpose of the slots 24 will be explained below. The adapter plate 20 further carries a plurality of guide pins 25 (one shown) which extend axially from the base 21.

The mounting fixture 10 includes a circular face plate 30 which is secured to the end of the adapter plate sleeve 23. The face plate 30 has a central circular opening 31 formed therethrough. A plurality of radial slots 32 (one shown) are formed in the outer edge of the face plate 30. The slots 32 are spaced equally about the circumference of the face plate 30. Each slot 32 has a cam pin 33 mounted transversely thereacross. The purpose for the slots 32 and the cam pins 33 will be explained below. A plurality of part rests 34 (one shown) are mounted upon the outer surface of the face plate 30. The part rests 34 are spaced equally about the circumference of the face plate 30.

The face plate opening 31 receives a generally cylindrical center sleeve 35. The center sleeve 35 has a central axial bore 36 formed therethrough. A pilot tube 40 is disposed within the center sleeve bore 36. As will be explained below, the pilot tube 40 corresponds to a particular wheel design. The pilot tube 40 has a piston bore 41 formed therethrough. A counter bore 42 is formed in the outer end of the piston bore 41. A flange 43 is formed on the outer end of the pilot tube 40. A first plurality of compression springs 44 (one shown) are disposed between the pilot tube flange 43 and the outer end of the center sleeve 35. The pilot tube flange 43 also carries a plurality of locator pylons 45 (one shown) the purpose for which will be explained below.

The mounting fixture 10 also includes a piston 50 which is disposed within the pilot tube bore 41. The piston 50 has an outer end 51 which is formed to contact the center portion of a wheel hub. The piston outer end 51 has a greater diameter than the remainder of the piston 45 and defines a shoulder 52 therebetween. A second plurality of compression springs 53 (one shown) are disposed between the piston shoulder 52 and the pilot tube flange 53.

The mounting fixture 10 further includes an axially movable yoke plate 60 which is disposed within the adapter plate sleeve 23. The yoke plate 60 is circular and has a plurality of guide pin holes 61 formed therethrough. Each of the guide pin holes 61 slidably receives one of the guide pins 25. The yoke plate 60 also has a plurality of radially extending arms 62 (one shown) which correspond to the adapter plate slots 24. The arms 62 are spaced equally about the circumference of the yoke plate 60 and each arm 62 extends through one of the adapter plate slots 24. An actuator bar 63 is secured to the center of the yoke plate 60 and extends axially through the adapter plate opening 22. The actuator bar 63 is connected to a conventional means for axially shifting the actuator bar and yoke plate assembly.

A plurality of cam arms 65 (one shown) are pivotally mounted on the ends of the yoke plate arms 62. A first end of each cam arm is secured to each yoke plate arm 62 with a pivot pin 66. The center portion of each cam arm 65 has a generally L-shaped cam slot 67 formed therethrough. The cam slots 67 have a generally axial first arm 67A and a second arm 67B which is directed in a radially inward direction. Each cam slot 67 receives a corresponding cam pin 33. A removable cam arm jaw 68, which is shaped to clamp over a portion of a vehicle wheel rim, is attached to a second end of each cam arm 65.

As indicated above, the mounting fixture 10 is operative for clamping a vehicle wheel 15 to a lathe for machining the wheel 15 to its final shape. As shown in FIG. 1, the vehicle wheel 15 includes an annular wheel rim 70 having a circular wheel disc 71 formed across one end thereof. The wheel rim 70 includes a central drop well 72 and inboard and outboard tire bead seats 73 and 74. The outer ends of the wheel rim 70 are formed into inboard and outboard tire retaining flanges 75 and 76. The wheel disc 71 includes a central hub 77 supported within the wheel rim 70 by a plurality of wheel spokes 78 (one shown). The hub has a central pilot hole 79 and a plurality of wheel mounting holes 80 (one shown) formed therethrough.

The operation of the prior art mounting fixture 10 will now be described. The actuator bar 63 is axially extended into the adapter plate sleeve 23, axially shifting the yoke plate 60 away from the adapter plate base 21. As the yoke plate 60 is axially displaced, the cam slot 67 in each cam arm 65 slides along the corresponding cam pin 33. The cam pins 33 cooperate with the cam slots 67 to urge the cam arms 65 in an outward radial direction, thereby opening the mounting fixture 10. With the mounting fixture 10 opened, a wheel 15 can be mounted upon the mounting fixture 10. The wheel hub 77 is placed adjacent to the outer end 51 of the piston 50 with the outboard tire bead retaining flange engaging the part rests 34. The locator pylons 45 are received by corresponding wheel mounting holes 80. The actuator bar 63 is then retracted, moving the yoke plate 60 axially towards the adapter plate base 21. As the yoke plate 60 is moved towards the yoke plate base 21, the cam slots 67 in each of the cam arms 65 is drawn back over the cam pins 33. The cam pins 33 cooperate with the cam slots 67 to urge the cam arms 65 in an inward radial direction, thereby causing the jaws 68 to move to a closed position and clamp onto the wheel flange 76. As the cam arms 65 continue to be drawn back, the wheel flange 76 is drawn firmly against the part rests 34. Additionally, the piston outer end 51 is axially shifted by the wheel hub 77, compressing the first and second sets of compression springs 44 and 53. When the lathe is started, the locator pylons 45 cooperate with the wheel mounting holes 80 to rotate the wheel.

While the wheel 15 is shown having a wheel disc 71 located at an end of the wheel rim 70, it will be appreciated that the wheel disc also can be recessed within the wheel rim 70. For such wheels, a different pilot tube and piston having a greater axial length would be substituted for the ones shown in FIG. 1.

As shown in FIG. 1, the cam arm jaws 68 extend over a portion of the vehicle wheel outboard tire bead seat 74. This prevents machining both bead seats 73 and 74 during a single machining operation. Accordingly, it is necessary to machine one bead seat, remove the wheel 70 from the mounting fixture 10, reverse the wheel 70, remount the wheel 70 on the mounting fixture 10 and then machine the second bead seat. In order to remount the wheel 15 shown in FIG. 1 on the fixture 10, it is necessary to replace pilot tube and piston assembly with a longer assembly which will axially span the inside of the wheel rim 70 to contact the inboard face of the wheel disc 71. Alternately, a second lathe can be used to machine the second tire bead seat. Either procedure is time consuming and can result in non-concentric tire bead seats. Accordingly, it would be desirable to machine both tire bead seats 73 and 74 during a single machining operation.

Figure 2:
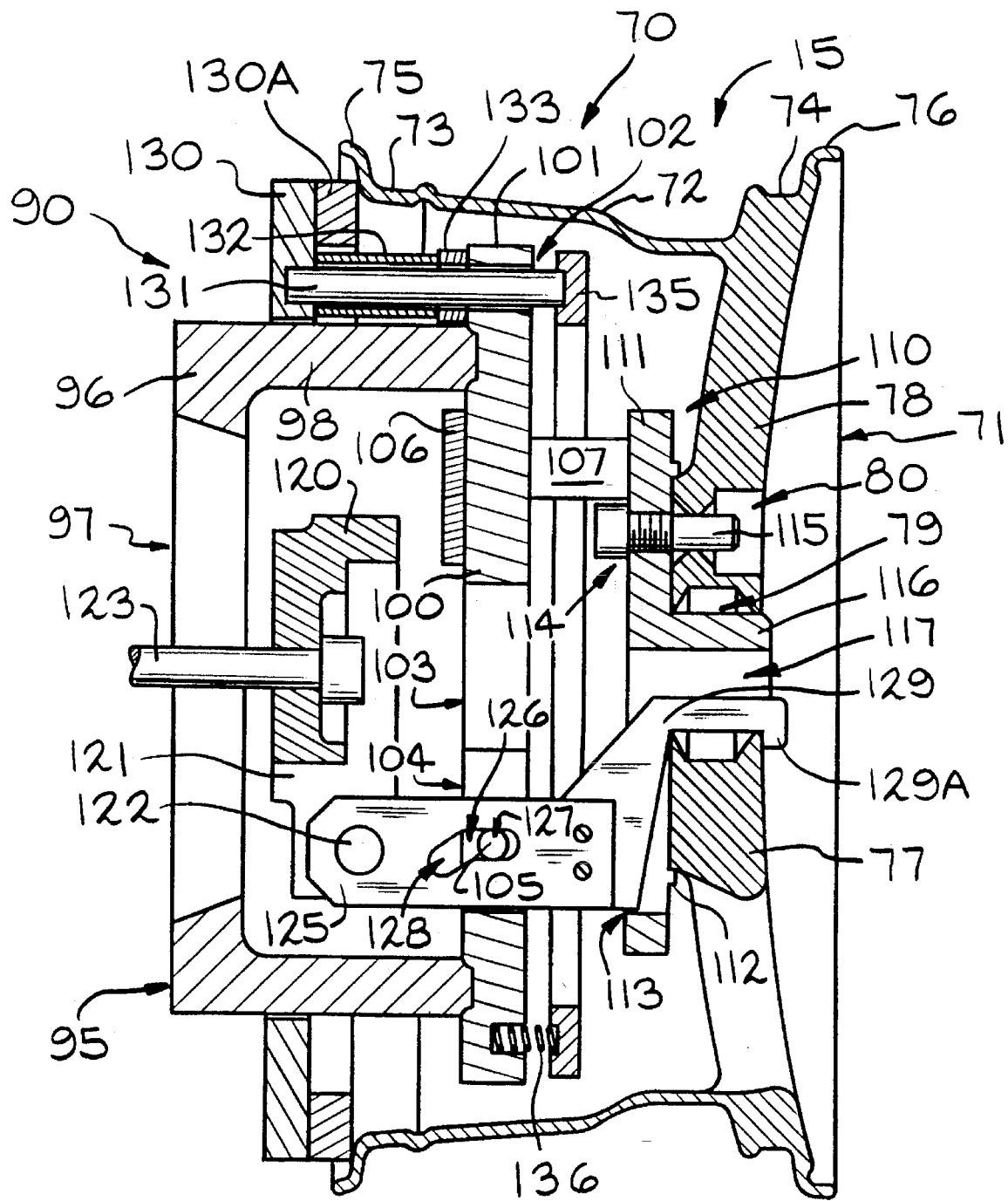
FIG. 2 is a sectional view of a fixture for mounting a wheel upon a lathe and a vehicle wheel in accordance with the present invention.
Figure 3:
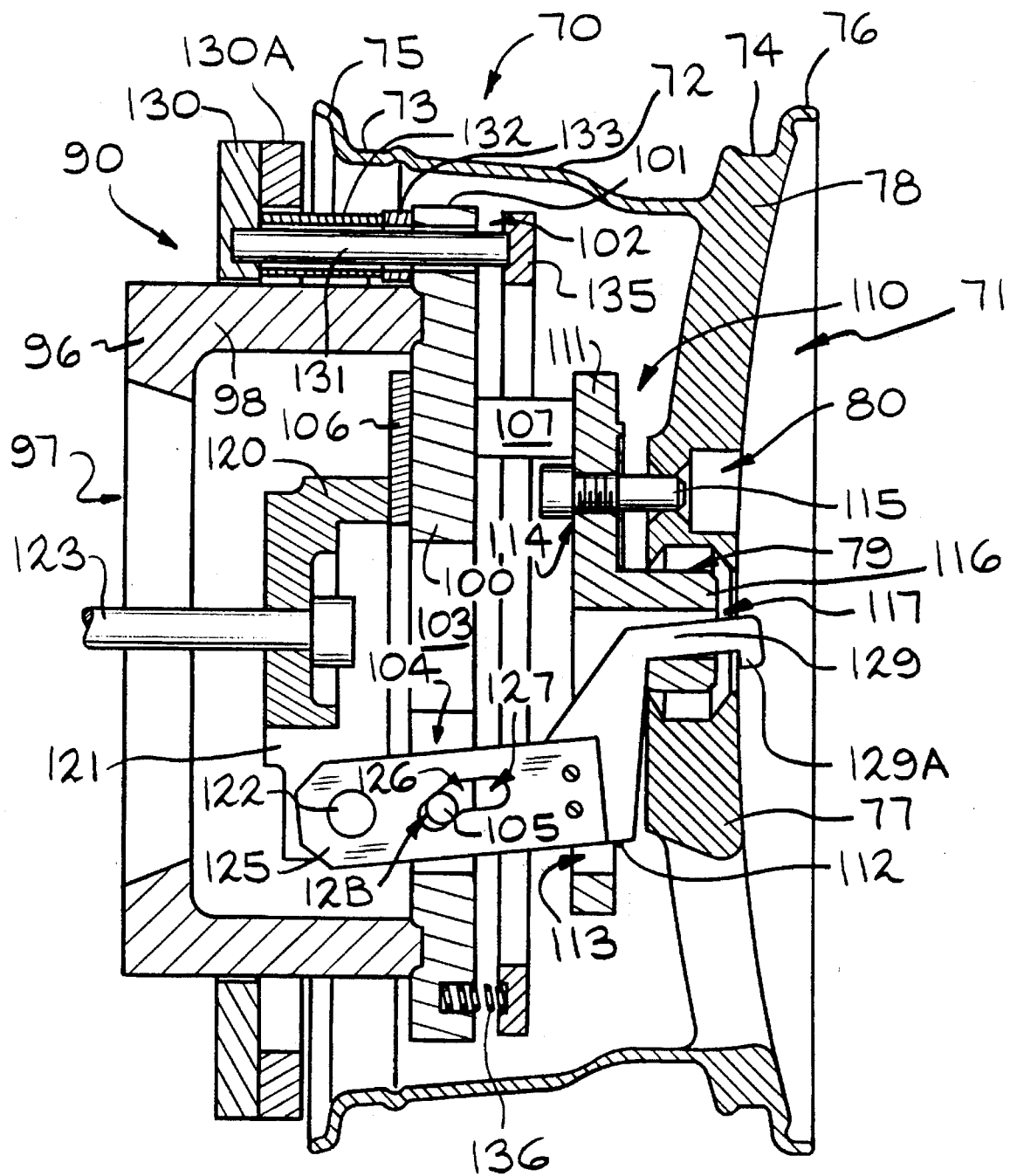
FIG. 3 is a sectional view of the mounting fixture shown in FIG. 2 with opened clamp jaws.

The present invention contemplates an improved fixture for mounting a vehicle wheel upon a lathe, which is illustrated generally at 90 in the sectional view shown in FIGS. 2 and 3. In the interest of simplicity, fasteners which secure components of the improved mounting fixture 90 to one another are not shown in FIGS. 2 and 3. The vehicle wheel 15 described above is shown mounted upon the improved mounting fixture 90. Accordingly, portions of the wheel 15 shown in FIGS. 2 and 3 are identified with the same numerical indicators used in FIG. 1.

The mounting fixture 90 includes an adapter plate 95 which can be secured to the rotatable spindle of a lathe (not shown) by conventional means. The adapter plate 95 includes a circular base 96 which has a central circular opening 97 formed therethrough. The adapter plate 95 also includes a cylindrical sleeve 98 extending in an axial direction from the base 96.

A circular face plate 100 is secured to an end of the adapter plate sleeve 98. The face plate 100 has a portion 101 which extends radially beyond the adapter sleeve 98. The portion 101 has a plurality of guide pin holes 102 (one shown) formed therethrough. The guide pin holes 102 are equally spaced about the circumference of the face plate 100. The face plate 100 also has a central circular opening 103 formed therethrough. A plurality of axial slots 104 (one shown) extend radially from the opening 103. The slots 104 are spaced equally about the circumference of the face plate opening 103. Each slot 104 has a cam pin 105 mounted transversely thereacross. A stop block 106, the purpose for which will be explained below, is carried on the inner surface of the face plate 100. The face plate 100 carries a plurality of spacer posts 107 (one shown). The spacer posts 107 are spaced equally about a circle which is concentric with the face plate opening 103.

A circular part rest 110 is removably secured to the outer ends of the spacer posts 107. The part rest 110 supports and centers the wheel 15 upon the mounting fixture 90. Accordingly, the part rest 110 is shaped to correspond to a corresponding wheel design. As will be explained below, the present invention contemplates a plurality of interchangeable part rests 110 to allow machining a number of different vehicle wheels.

The part rest 110 includes a circular base 111. An annular sleeve 112 extends axially from the outer surface of base 111. As shown in FIG. 2, the sleeve 112 contacts a portion of the wheel hub 77 to center the wheel 15 upon the mounting fixture 90. The part rest base 111 has a plurality of radial slots 113 formed therethrough (one shown). The slots extend outwardly from the center of the part rest 110. The part rest base 111 also has a threaded drive pin aperture 114 formed therethrough. The drive pin aperture 114 receives a drive pin 115. The drive pin 115 extends in an axial direction from the part rest base 111. The part rest 110 further includes a mounting post 116 extending axially from the center thereof. The post 116 has a plurality of axial slots 117 formed therein (one shown). Each of the mounting post slots 117 is aligned with a corresponding base slot 113 to form an extension thereof.

The improved mounting fixture 90 also includes an axially movable yoke plate 120 which is disposed within the adapter plate sleeve 98. The yoke plate has a plurality of radial slots 121 (one shown) formed therein. The slots are spaced equally about the circumference of the yoke plate 120. Each slot 121 caries a transversely mounted pivot pin 122. An actuator bar 123 is secured to the center of the yoke plate 120 and extends through the adapter plate opening 97. The actuator bar 123 is connected to a conventional means for axially shifting the actuator bar and yoke plate assembly.

A plurality of cam arms 125 (one shown) are pivotally mounted on the yoke plate 120. A first end of each cam arm 125 is secured in one of the yoke plate slots 121 with one of the pivot pins 122. The cam arms 125 extend axially through corresponding face plate slots 104. The center portion of each cam arm 125 has a generally L-shaped cam slot 126 formed therethrough. The cam slots 126 have a generally axial first arm 127 and a second arm 128 which is directed in a radially outward direction. Each cam slot 126 receives a corresponding cam pin 105. A removable cam arm jaw 129 is attached to a second end of each cam arm 125. The cam arm jaws 129 are offset in a radial inward direction to extend through the part rest and mounting post slots 113 and 117. An end of each cam arm jaw 129 extends beyond the part rest post 116 and includes a finger 129A which clamps over a portion of the outboard surface of a vehicle wheel hub 77.

The improved mounting fixture 90 further includes an annular dampening ring having a circular base 130 disposed about the adapter plate sleeve 98. An annular sleeve 130A formed from a resilient material, such as nylon, is mounted upon the base 130. The dampening ring base 130 carries a plurality of guide pins 131 (one shown) which extend axially therefrom. The guide pins 131 are spaced equally about a circle which is concentric with the dampening ring 130. Each of guide pins 131 extends axially through a corresponding face plate guide pin hole 102. A spacer sleeve 132 and resilient bushing 133 is carried by each guide pin 131 between the dampening ring base 130 and the spring ring. The spacer sleeve 132 and bushing 133 position the dampening ring axially on the adapter plate sleeve 98. One end of each guide pin is secured to the dampening ring base 130 and the other end is secured to an annular spring ring 135. The spring ring 135 is disposed between the face plate 101 and the part rest 110. A plurality of compression springs 136 (one shown) are disposed between the spring ring 135 and the face plate 100. The compression springs 136 urge the spring plate 135 in an axial direction away from the face plate 101, causing the spacer sleeves 132 to compress the bushings 133.

The operation of the improved mounting fixture 90 will now be described. The actuator bar 123 is axially extended into the adapter plate sleeve 98 until the yoke plate 120 contacts the stop block 106. This axially shifts the yoke plate 120 away from the adapter plate base 96 as shown in FIG. 3. As the yoke plate 120 is axially shifted, the cam slot 126 in each cam arm 125 slides along the corresponding cam pin 105. Because the second leg 128 of the cam slot 126 is directed radially outward, the cam pins 105 cooperate with the cam slots 126 to urge the cam arms 125 in an inward radial direction, thereby opening the mounting fixture 90 by moving the cam arm jaws 129 and fingers 129A to a released position.

With the mounting fixture 90 opened, a wheel 15 can be mounted upon the mounting fixture 90. The wheel hub 77 is placed adjacent to the part rest base 111 with the part rest post 116 and the cam arm jaws 129 extending through the wheel pilot hole 79. The part rest annular sleeve 112 extends around the circumference of the wheel hub 77, positioning the wheel 15 concentrically upon the fixture 90. The drive pin 115 is received by one of the wheel mounting holes 80. Retraction of the actuator bar 123 is begun, moving the yoke plate 120 axially towards the adapter plate base 96. As the yoke plate 120 moves towards the adapter plate base 96, the cam slots 126 in each of the cam arms 125 are drawn back over the cam pins 105. The cam pins 105 cooperate with the cam slots 126 to urge the cam arms 125 in an outward radial direction, causing the cam arm jaws 129 to move to a closed position and the fingers 129A to clamp onto the outboard surface of the wheel hub 77.

As the cam arms 125 are drawn further back, the wheel 15 is moved axially towards the dampening ring sleeve 130A. The inboard wheel flange 75 engages and presses against the resilient dampening ring sleeve 130A, shifting the dampening ring axially and further compressing the compression springs 136. When the actuator bar 123 is fully retracted, the cam arm jaw fingers 129A firmly clamp the inboard wheel hub mounting surface against the part rest 110. This supports the outboard end of the wheel 15 while the inboard end of the wheel 15 is supported by the dampening ring sleeve 130A. When the lathe is started, the drive pin 115 cooperates with the wheel mounting hole 80 to rotate the wheel 15.

While the wheel 15 is shown having a wheel disc 71 located at an end of the wheel rim 70, it will be appreciated that the wheel disc also can be recessed within the wheel rim 70. For such wheels, alternate spacer posts and another dampening ring sleeve having shorter axial lengths would be substituted for the ones shown in FIGS. 2 and 3. Similarly, for wider wheels, spacer posts and a dampening ring sleeve having a greater axial distance would be installed on the fixture 90. Different wheel hub designs can be accommodated by installing different cam arm jaws 129 and a different part rest 110. This interchangability of parts allows the fixture 90 to be used for multiple wheel designs.

As shown in FIGS. 2 and 3, the cam arm jaws 129 and fingers 129A clamp onto an interior surface of the wheel 15. As mentioned above, an interior surface of the inboard end of the wheel 15 is supported by the resilient dampening ring sleeve 130A. Thus, both bead seats 73 and 74 are exposed for machining during a single machining operation. This reduces machining time while improving the concentricity of the bead seats 73 and 74.

It will be appreciated that the mounting fixture 90 shown in FIGS. 2 and 3 is illustrative of the invention. Accordingly, the invention can be practiced with a mounting fixture having more or less parts than are shown in FIGS. 2 and 3. Additionally, while the invention has been described as being used to machine the tire bead seats 73 and 74, it will be appreciated that the improved mounting fixture 90 can be used during machining of any or all of the outer surfaces of the wheel rim 70.

The principle and mode of the invention have been described and illustrated in its preferred embodiment. However, it must be understood that the invention may be practiced otherwise than as specifically explained and illustrated without departing from its spirit or scope. For example, the cam arm jaws can be extended in a radial outward direction to pass through the openings in the wheel disc formed between the wheel spokes 78. With such cam arms, the jaw fingers would be directed radially inward and would engage the circumference of the wheel hub outboard surface.

What is claimed is:

1. An apparatus adapted to releaseably clamp a vehicle wheel to a lathe spindle, the vehicle wheel including an annular wheel rim having a wheel disc formed across an end thereof, the wheel disc having a central pilot hole and a plurality of attachment holes formed therethrough, the apparatus comprising:

a support structure adapted to be secured to a lathe spindle;

a plurality of rigid arms movably mounted upon said support structure, said arms adapted to extend axially within the vehicle wheel and being movable between a first and a second position, each of said arms having a first end and a second end with said second end adapted to clamp a portion of the vehicle wheel disc against a portion of said support structure when said arms are in said second position; and an actuator plate, said actuator plate being axially shiftable between a first axial position and a second axial position, said second end of each of said arms pivotally connected to said actuator plate with said arms being in said first arm position when said actuator plate is in said first axial position and in said second arm position when said actuator plate is in said second axial position.

2. An apparatus as described in claim 1 wherein said arms are adapted to extend through the wheel disc pilot hole.

3. An apparatus as described in claim 1 wherein said support structure includes an adapter plate adapted to be secured to an end of a lathe spindle, a face plate mounted upon said adapter plate, a part rest having a center opening formed therethrough mounted upon said face plate, said part rest being adapted to support the vehicle wheel, and further wherein said arms are movably mounted upon said face plate and extend through said part rest opening.

4. An apparatus as described in claim 3 wherein said part rest has an annular sleeve formed upon a surface thereof, said sleeve adapted to concentrically align the vehicle wheel with said adapter plate.

5. An apparatus as described in claim 3, wherein each of said arms has a clamp jaw formed on an end thereof, said clamp jaws cooperating with said part rest to clamp a portion of the wheel disc to the apparatus when said arms are moved to said second position.

6. An apparatus as described in claim 5 wherein said clamp jaws are formed on a first end of said arms, said arms having a second end pivotally connected to an actuator plate, said actuator plate being axially shiftable between a first axial position and a second axial position, said arms being in said first arm position when said actuator plate is in said first axial position and in said second arm position when said actuator plate is in said second axial position.

7. An apparatus as described in claim 3 wherein said adapter plate includes a base portion adapted to be secured to the end of a lathe spindle and a cylindrical sleeve portion extending axially from said base portion, and further wherein an annular dampening plate is disposed about said adapter plate sleeve, said dampening plate being coupled to said face plate and adapted to support an end of the vehicle wheel rim opposite from the end supported by said part rest.

8. An apparatus as described in claim 3 wherein said part rest includes a central post which is adapted to extend into the vehicle wheel pilot hole.

9. An apparatus adapted to releaseably clamp a vehicle wheel to a lathe spindle, the vehicle wheel including an annular wheel rim having a wheel disc formed across an end thereof, the wheel disc having a central pilot hole and a plurality of attachment holes formed therethrough, the apparatus comprising:

a support structure including an adapter plate adapted to be secured to an end of a lathe spindle, a face plate mounted upon said adapter plate and a part rest having a center opening formed therethrough mounted upon said face plate, said part rest being adapted to support the vehicle wheel;

a plurality of arms movably mounted upon said face plate and extending through said part rest opening, said arms also adapted to extend axially within the vehicle wheel and being movable between a first and a second position, each of said arms having a clamp jaw formed on a first end thereof, said clamp jaws cooperating with said part rest to clamp a portion of the vehicle wheel disc against said part rest when said arms are moved to said second position; and an actuator plate, said actuator plate being axially shiftable between a first axial position and a second axial position, said arms having a second end pivotally connected to said actuator plate with said arms being in said first arm position when said actuator plate in said first axial position and in said second arm position when said actuator plate is in said second axial position.

10. An apparatus adapted to releaseably clamp a vehicle wheel to a lathe spindle, the vehicle wheel including an annular wheel rim having a wheel disc formed across an end thereof, the wheel disc having a central pilot hole and a plurality of attachment holes formed therethrough, the apparatus comprising:

a support structure including an adapter plate having a base portion adapted to be secured to an end of a lathe spindle and a cylindrical sleeve portion extending axially from said base portion, said support structure also including a face plate mounted upon said adapter plate and a part rest having a center opening formed therethrough mounted upon said face plate, said part rest being adapted to support the vehicle wheel;

an annular dampening plate disposed about said adapter plate sleeve, said dampening plate being coupled to said face plate and adapted to support an end of the vehicle wheel rim opposite from the end supported by said part rest;

a plurality of arms movably mounted upon said face plate and extending through said part rest opening, said arms also adapted to extend axially within the vehicle wheel and being movable between a first and a second position, said arms adapted to clamp a portion of the vehicle wheel disc against said part rest when said arms are moved to said second position; and means for moving said arms from said first position to said second position.

11. An apparatus as described in claim 10 wherein said dampening plate includes a portion formed from a resilient material, said resilient portion adapted to support said wheel rim end.

12. An apparatus adapted to releaseably clamp a vehicle wheel disc to a lathe spindle, the wheel disc having an aperture formed therethrough, the apparatus comprising:

a support structure adapted to be secured to a lathe spindle;

a plurality of arms movably mounted upon said support structure, said arms adapted to extend axially into the wheel disc aperture and being movable between a first and a second position, each of said arms having a first end and a second end with said second end adapted to clamp a portion of the wheel disc against a portion of said support structure when said arms are in said second position; and an actuator plate, said actuator plate being axially shiftable between a first axial position and a second axial position, said second end of each of said arms pivotally connected to said actuator plate with said arms being in said first arm position when said actuator plate is in said first axial position and in said second arm position when said actuator plate is in said second axial position.

13. A method for machining a portion of a vehicle wheel upon a lathe comprising the steps of:

(a) providing an apparatus for releaseably clamping a wheel disc to a lathe spindle, the apparatus having a support structure adapted to be secured to the lathe spindle, the apparatus also having a plurality of arms movably mounted upon the support structure, the arms being movable between a first and a second position, each of the arms having a first end and a second end with the second end adapted to clamp a portion of the wheel disc against a portion of the support structure when the arms are in the second position; the apparatus further including an actuator plate, the actuator plate being axially shiftable between a first axial position and a second axial position, the second end of each of the arms pivotally connected to the actuator plate with the arms being in the first arm position when said actuator plate is in the first axial position and in the second arm position when the actuator plate is in the second axial position;

(b) positioning a wheel disc having an aperture formed therethrough adjacent to the apparatus with the arms extending into the aperture;

(c) moving the actuator plate from the first axial position to the second axial position to cause the jaws to clamp the wheel disc;

(d) machining a portion of the wheel disc;

(d) moving the actuator plate from the second axial position to the first axial position to cause the jaws to unclamp the wheel disc; and (e) removing the wheel disc from the apparatus.

* * * * *